US012259672B2

(12) United States Patent
Morikami et al.

(10) Patent No.: US 12,259,672 B2
(45) Date of Patent: Mar. 25, 2025

(54) TONER CONCENTRATION SENSING APPARATUS CAPABLE OF ACCURATELY SENSING TONER CONCENTRATION OF TONER IMAGE, IMAGE FORMING APPARATUS, AND TONER CONCENTRATION SENSING METHOD

(71) Applicant: KYOCERA Document Solutions Inc., Osaka (JP)

(72) Inventors: Ayato Morikami, Osaka (JP); Yasuaki Sakamoto, Osaka (JP); Masaru Watanabe, Osaka (JP); Kenichi Hayashi, Osaka (JP); Hideyuki Ogasawara, Osaka (JP); Yukiko Yoshimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/471,146

(22) Filed: Sep. 20, 2023

(65) Prior Publication Data

US 2024/0103399 A1 Mar. 28, 2024

(30) Foreign Application Priority Data

Sep. 28, 2022 (JP) ................................ 2022-154706

(51) Int. Cl.
*G03G 15/00* (2006.01)

(52) U.S. Cl.
CPC ..... *G03G 15/5041* (2013.01); *G03G 15/5058* (2013.01); *G03G 2215/00042* (2013.01); *G03G 2215/00059* (2013.01)

(58) Field of Classification Search
CPC .......... G03G 15/5041; G03G 15/5058; G03G 2215/00042; G03G 2215/00059
(Continued)

(56) References Cited

U.S. PATENT DOCUMENTS 4,829,336 A * 5/1989 Champion ......... G03G 15/0855 399/60
5,386,276 A * 1/1995 Swales ............... G03G 15/0855 430/30
(Continued)

FOREIGN PATENT DOCUMENTS

JP 2002236402 A 8/2002

*Primary Examiner* — Robert B Beatty
(74) *Attorney, Agent, or Firm* — Alleman Hall & Tuttle LLP

(57) ABSTRACT

A toner concentration sensing apparatus includes a first acquisition processing portion, a second acquisition processing portion, and a third acquisition processing portion. The first acquisition processing portion acquires a first sensing value corresponding to light reflected by a first region of an image-carrying member where a toner image is not formed. The second acquisition processing portion acquires a second sensing value corresponding to light reflected by a second region of the image-carrying member where a toner image has been formed. The third acquisition processing portion acquires a component ratio of a component in the second sensing value, that corresponds to light reflected by toner adhered onto a surface of the image-carrying member, using a specific calculation formula determined based on a first relational expression based on the first sensing value and a second relational expression not based on the first sensing value, and the second sensing value.

5 Claims, 5 Drawing Sheets

(58) Field of Classification Search
USPC .................................................... 399/27, 49
See application file for complete search history.

(56) References Cited

U.S. PATENT DOCUMENTS

| | | | | |
|---|---|---|---|---|
| 6,463,227 | B1 * | 10/2002 | Denton .............. | G03G 15/5058 399/49 |
| 2002/0110381 | A1 | 8/2002 | Maebashi et al. | |
| 2003/0058460 | A1 * | 3/2003 | Denton .............. | G03G 15/5058 358/1.14 |

* cited by examiner

TONER CONCENTRATION SENSING APPARATUS CAPABLE OF ACCURATELY SENSING TONER CONCENTRATION OF TONER IMAGE, IMAGE FORMING APPARATUS, AND TONER CONCENTRATION SENSING METHOD

INCORPORATION BY REFERENCE

This application is based upon and claims the benefit of priority from the corresponding Japanese Patent Application No. 2022-154706 filed on Sep. 28, 2022, the entire contents of which are incorporated herein by reference.

BACKGROUND

The present disclosure relates to an image forming apparatus that uses electrophotography, a toner concentration sensing apparatus provided in the image forming apparatus, and a toner concentration sensing method.

An image forming apparatus that uses electrophotography includes a toner concentration sensing apparatus which senses a toner concentration of a toner image formed on an image-carrying member such as an intermediate transfer belt. For example, there is known a toner concentration sensing apparatus including a light-emitting portion and a light-receiving portion. The light-emitting portion emits light toward the image-carrying member. The light-receiving portion receives light that is emitted from the light-emitting portion and is reflected by the image-carrying member, and outputs a sensing value corresponding to a received light amount. In the toner concentration sensing apparatus, a toner concentration of a toner image irradiated with light emitted from the light-emitting portion is sensed based on the sensing value output from the light-receiving portion.

In the image forming apparatus, a surface condition of the image-carrying member changes along with an increase in the number of uses of the apparatus. When the surface condition of the image-carrying member changes, an amount of light that is emitted from the light-emitting portion and is reflected by the image-carrying member changes, to thus result in lowering of an accuracy of the toner concentration sensing apparatus in sensing a toner concentration of a toner image. In contrast, there is known, as the related art, an image forming apparatus which corrects, based on a sensing value that is output from the light-receiving portion and corresponds to light reflected by a region of the image-carrying member where a toner image is not formed, a sensing value that is output from the light-receiving portion and corresponds to light reflected by a toner image formed on the image-carrying member.

SUMMARY

A toner concentration sensing apparatus according to one aspect of the present disclosure includes a light-emitting portion, a light-receiving portion, a first acquisition processing portion, and a second acquisition processing portion. The light-emitting portion emits light toward an image-carrying member which carries a toner image. The light-receiving portion receives light that is emitted from the light-emitting portion and is reflected by the image-carrying member, and outputs a sensing value corresponding to a received light amount. The first acquisition processing portion acquires a first sensing value that is output from the light-receiving portion and corresponds to light that is emitted from the light-emitting portion and is reflected by a first region of the image-carrying member where a toner image is not formed. The second acquisition processing portion acquires a second sensing value that is output from the light-receiving portion and corresponds to light that is emitted from the light-emitting portion and is reflected by a second region of the image-carrying member where a toner image has been formed. Herein, in the toner concentration sensing apparatus, the sensing value is constituted by a first component corresponding to light reflected by a surface of the image-carrying member and a second component corresponding to light reflected by toner adhered onto the surface of the image-carrying member. Further, a relationship between the first component and a component ratio of the second component in the sensing value is defined by a first relational expression determined based on the first sensing value. Further, a relationship between the second component and the component ratio of the second component in the sensing value is defined by a second relational expression determined without using the first sensing value. Furthermore, the toner concentration sensing apparatus includes a third acquisition processing portion. The third acquisition processing portion acquires a component ratio of the second component in the second sensing value using a specific calculation formula determined based on the first relational expression and the second relational expression, and the second sensing value.

An image forming apparatus according to another aspect of the present disclosure includes the toner concentration sensing apparatus and the image-carrying member.

A toner concentration sensing method according to another aspect of the present disclosure is executed in a toner concentration sensing apparatus including a light-emitting portion which emits light toward an image-carrying member which carries a toner image and a light-receiving portion which receives light that is emitted from the light-emitting portion and is reflected by the image-carrying member, and outputs a sensing value corresponding to a received light amount, and includes a first acquisition step and a second acquisition step. The first acquisition step includes acquiring a first sensing value that is output from the light-receiving portion and corresponds to light that is emitted from the light-emitting portion and is reflected by a first region of the image-carrying member where a toner image is not formed. The second acquisition step includes acquiring a second sensing value that is output from the light-receiving portion and corresponds to light that is emitted from the light-emitting portion and is reflected by a second region of the image-carrying member where a toner image has been formed. Herein, in the toner concentration sensing method, the sensing value is constituted by a first component corresponding to light reflected by a surface of the image-carrying member and a second component corresponding to light reflected by toner adhered onto the surface of the image-carrying member. Further, a relationship between the first component and a component ratio of the second component in the sensing value is defined by a first relational expression determined based on the first sensing value. Further, a relationship between the second component and the component ratio of the second component in the sensing value is defined by a second relational expression determined without using the first sensing value. Furthermore, the toner concentration sensing method includes a third acquisition step. The third acquisition step includes acquiring a component ratio of the second component in the second sensing value using a specific calculation formula determined based on the first relational expression and the second relational expression, and the second sensing value.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an example of embodying the present disclosure and does not limit the technical scope of the present disclosure.

[Configuration of Image Forming Apparatus 100]

First, a configuration of an image forming apparatus 100 according to the embodiment of the present disclosure will be described with reference to FIG. 1 and FIG. 2.

It is noted that for convenience of descriptions, a vertical direction in a state where the image forming apparatus 100 is installed in a usable state (state shown in FIG. 1) is defined as an up-down direction D1. In addition, a front-rear direction D2 is defined with a surface of the image forming apparatus 100 on a left side of the diagram shown in FIG. 1 being a front surface (front side). In addition, a left-right direction D3 is defined using the front surface of the image forming apparatus 100 in the installed state as a reference.

The image forming apparatus 100 is an image processing apparatus having a printing function for forming an image based on image data. Specifically, the image forming apparatus 100 is a multifunction peripheral having a plurality of functions including the printing function. It is noted that the image forming apparatus according to the present disclosure may also be a printer, a facsimile apparatus, or a copying machine that is capable of forming an image using electrophotography.

Figure 1:
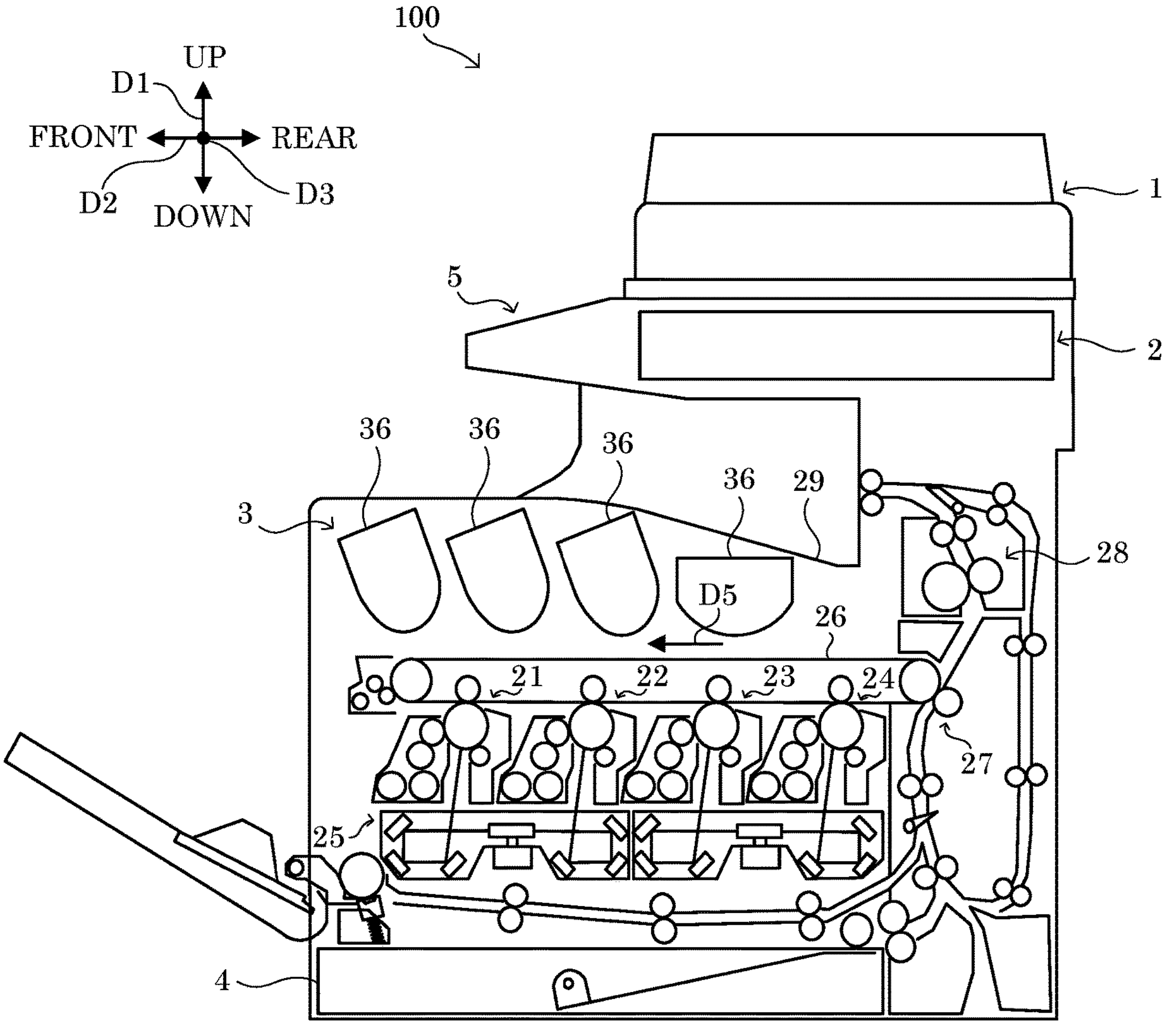
FIG. 1 is a cross-sectional view showing a configuration of an image forming apparatus according to an embodiment of the present disclosure.
Figure 2:
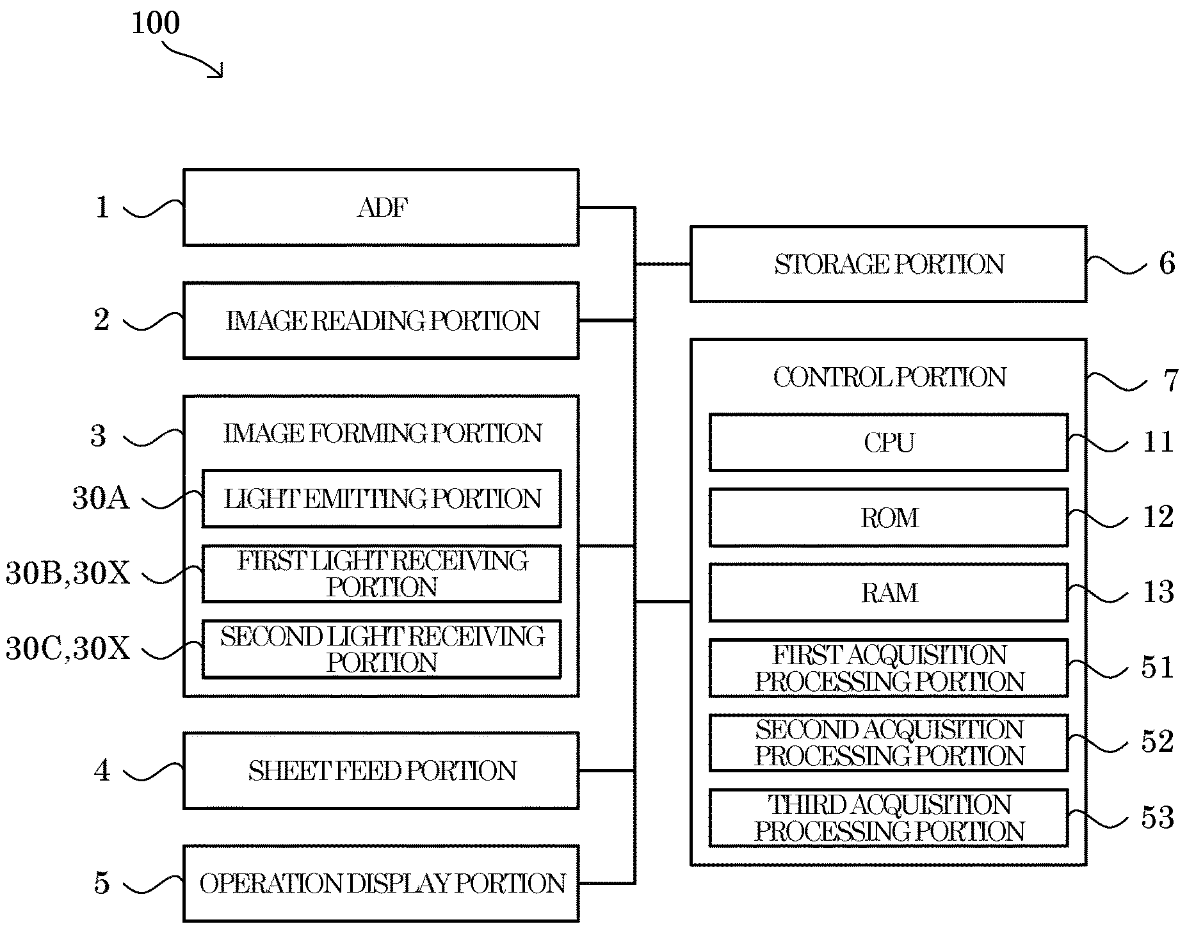
FIG. 2 is a block diagram showing a system configuration of the image forming apparatus according to the embodiment of the present disclosure.

As shown in FIG. 1 and FIG. 2, the image forming apparatus 100 includes an ADF (Auto Document Feed) 1, an image reading portion 2, an image forming portion 3, a sheet feed portion 4, an operation display portion 5, a storage portion 6, and a control portion 7.

The ADF 1 conveys a document sheet an image of which is to be read by the image reading portion 2. The ADF 1 includes a document sheet setting portion, a plurality of conveying rollers, a document sheet holder, and a sheet discharge portion.

The image reading portion 2 realizes a scanning function for reading an image on a document sheet. The image reading portion 2 includes a document sheet table, a light source, a plurality of mirrors, an optical lens, and a CCD (Charge Coupled Device).

The image forming portion 3 realizes the printing function. Specifically, the image forming portion 3 forms a color or monochrome image on a sheet supplied from the sheet feed portion 4 using electrophotography.

The sheet feed portion 4 supplies a sheet to the image forming portion 3. The sheet feed portion 4 includes a sheet feed cassette, a manual feed tray, and a plurality of conveying rollers.

The operation display portion 5 is a user interface of the image forming apparatus 100. The operation display portion 5 includes a display portion and an operation portion. The display portion displays various types of information in response to control instructions from the control portion 7. The display portion is, for example, a liquid crystal display. The operation portion is used for inputting various types of information to the control portion 7 in accordance with user operations. The operation portion is, for example, a touch panel.

The storage portion 6 is a nonvolatile storage device. For example, the storage portion 6 is a nonvolatile memory such as a flash memory. It is noted that the storage portion 6 may also be an SSD (Solid State Drive) or an HDD (Hard Disk Drive).

The control portion 7 collectively controls the image forming apparatus 100. As shown in FIG. 2, the control portion 7 includes a CPU 11, a ROM 12, and a RAM 13. The CPU 11 is a processor which executes various types of calculation processing. The ROM 12 is a nonvolatile storage device in which information such as control programs for causing the CPU 11 to execute various types of processing is stored in advance. The RAM 13 is a volatile or nonvolatile storage device which is used as a temporary storage memory (working area) for the various types of processing executed by the CPU 11. The CPU 11 executes the various control programs stored in advance in the ROM 12, to thus collectively control the image forming apparatus 100.

It is noted that the control portion 7 may be a control portion provided separately from a main control portion that collectively controls the image forming apparatus 100. Alternatively, the control portion 7 may be constituted by an electronic circuit such as an integrated circuit (ASIC).

[Configuration of Image Forming Portion 3]

Next, a configuration of the image forming portion 3 will be described with reference to FIG. 1 to FIG. 4. Herein, FIG. 3 is a cross-sectional view showing a configuration of an image forming unit 24.

As shown in FIG. 1, the image forming portion 3 includes a plurality of image forming units 21 to 24, a laser scanning unit 25, an intermediate transfer belt 26, a secondary transfer roller 27, a fixing device 28, and a sheet discharge tray 29. Further, the image forming portion 3 includes an optical sensor 30 shown in FIG. 3 and FIG. 4.

The image forming unit 21 forms a Y (yellow) toner image. The image forming unit 22 forms a C (cyan) toner image. The image forming unit 23 forms an M (magenta) toner image. The image forming unit 24 forms a K (black) toner image. As shown in FIG. 1, the image forming units 21 to 24 are arranged next to one other along the front-rear direction D2 of the image forming apparatus 100 in the stated order of yellow, cyan, magenta, and black from the front side of the image forming apparatus 100.

Figure 3:
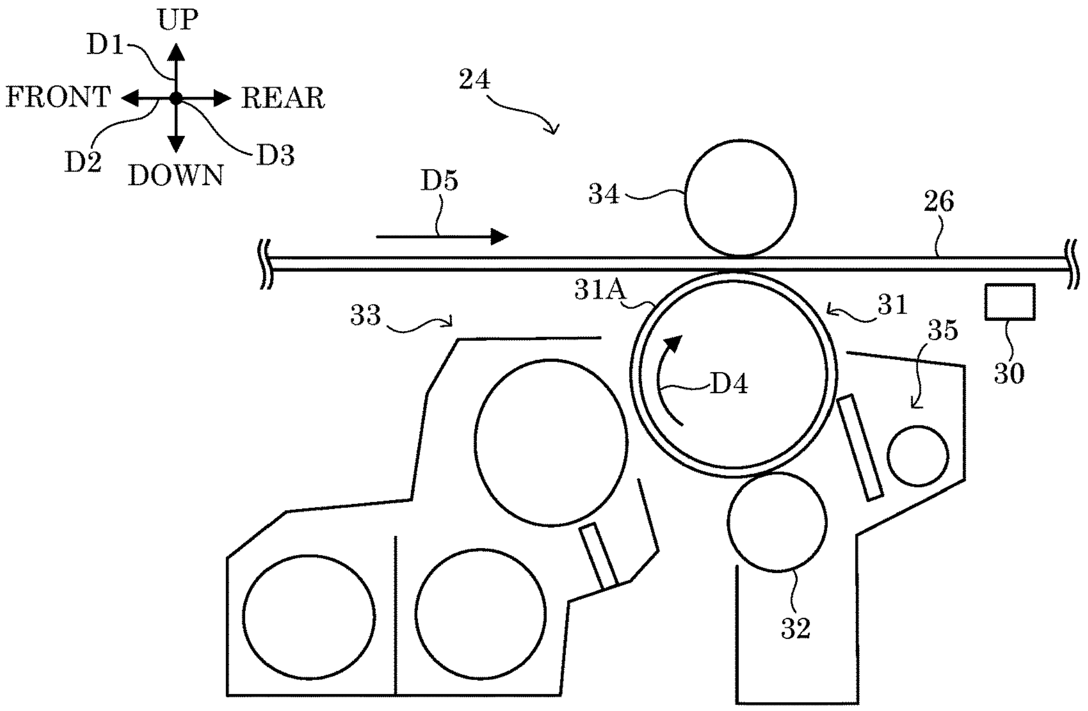
FIG. 3 is a cross-sectional view showing an image forming unit of the image forming apparatus according to the embodiment of the present disclosure.

As shown in FIG. 3, the image forming unit 24 includes a photoconductor drum 31, a charging roller 32, a developing device 33, a primary transfer roller 34, and a drum cleaning portion 35. The image forming units 21 to 23 also have configurations similar to that of the image forming unit 24. Moreover, each of the image forming units 21 to 24 includes a toner container 36 shown in FIG. 1.

An electrostatic latent image is formed on a surface of the photoconductor drum 31. For example, the photoconductor drum 31 includes a photosensitive layer 31A formed of an organic photosensitive material. Upon receiving a rotational driving force supplied from a motor (not shown), the photoconductor drum 31 rotates in a rotation direction D4 shown in FIG. 3. Thus, the photoconductor drum 31 conveys an electrostatic latent image formed on the surface thereof. It is noted that the photosensitive layer 31A may alternatively be formed by other photosensitive materials such as amorphous silicon.

Upon being applied with a preset charging voltage, the charging roller 32 charges the surface of the photoconductor drum 31. For example, the charging roller 32 charges the surface of the photoconductor drum 31 to a positive polarity. Light that is emitted from the laser scanning unit 25 and is based on image data is irradiated onto the surface of the photoconductor drum 31 charged by the charging roller 32. Thus, an electrostatic latent image is formed on the surface of the photoconductor drum 31.

The developing device 33 develops the electrostatic latent image formed on the surface of the photoconductor drum 31. The developing device 33 includes a pair of stirring members and a developing roller. The pair of stirring members stir developer that is stored inside the developing device 33 and contains toner and carriers. By this stirring, the toner and carriers contained in the developer are frictionally charged. For example, the toner contained in the developer is charged to a positive polarity by friction with the carriers. The developing roller draws the developer stirred by the pair of stirring members and conveys the developer to an opposing area between the developing roller and the photoconductor drum 31. Moreover, upon being applied with a preset developing bias voltage, the developing roller supplies the toner conveyed to the opposing area to the photoconductor drum 31. Thus, the toner is selectively supplied to an exposure area of the photoconductor drum 31 where light emitted from the laser scanning unit 25 has been irradiated, and thus the electrostatic latent image formed on the surface of the photoconductor drum 31 is developed. It is noted that the toner from the toner container 36 is supplied to the developing device 33.

Upon being supplied with a preset primary transfer current, the primary transfer roller 34 transfers the toner image formed on the surface of the photoconductor drum 31 onto an outer circumferential surface of the intermediate transfer belt 26. As shown in FIG. 3, the primary transfer roller 34 is provided opposed to the photoconductor drum 31 with the intermediate transfer belt 26 interposed therebetween.

The drum cleaning portion 35 removes toner that has remained on the surface of the photoconductor drum 31 after the transfer of the toner image by the primary transfer roller 34.

The laser scanning unit 25 emits light that is based on image data toward the surface of the photoconductor drum 31 of each of the image forming units 21 to 24.

The intermediate transfer belt 26 is an endless belt member onto which the toner image that has been formed on the surface of the photoconductor drum 31 of each of the image forming units 21 to 24 is transferred. The intermediate transfer belt 26 is stretched by a drive roller, a tension roller, and the four primary transfer rollers 34 at a predetermined tension. By the drive roller rotating upon receiving a rotational driving force supplied from a motor (not shown), the intermediate transfer belt 26 rotates in a rotation direction D5 shown in FIG. 1 and FIG. 3. The intermediate transfer belt 26 carries a toner image to be transferred onto a sheet. The intermediate transfer belt 26 is an example of an image-carrying member according to the present disclosure.

The secondary transfer roller 27 transfers the toner image transferred onto the surface of the intermediate transfer belt 26 onto a sheet supplied from the sheet feed portion 4.

The fixing device 28 fixes the toner image transferred onto the sheet by the secondary transfer roller 27 onto the sheet.

The sheet onto which the toner image has been fixed by the fixing device 28 is discharged onto the sheet discharge tray 29.

The optical sensor 30 is used to sense a toner concentration of a toner image formed on the intermediate transfer belt 26. As shown in FIG. 3, the optical sensor 30 is disposed on a downstream side of the image forming unit 24 in the rotation direction D5 of the intermediate transfer belt 26 and on an upstream side of the secondary transfer roller 27 in the rotation direction D5.

Figure 4:
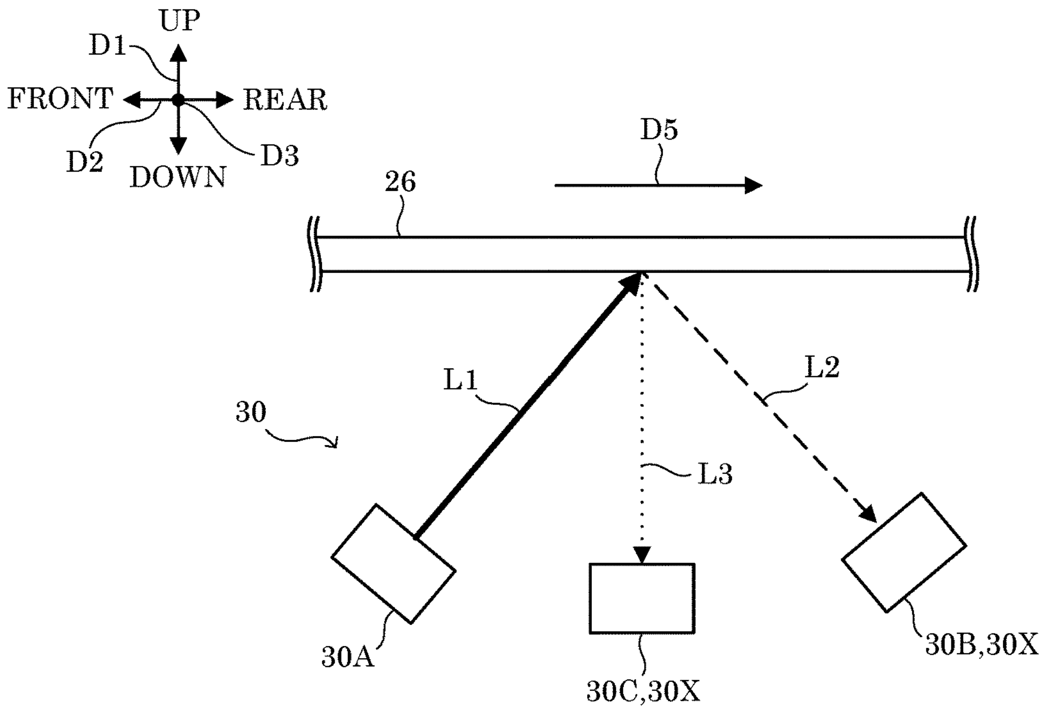
FIG. 4 is a side view showing a configuration of an optical sensor of the image forming apparatus according to the embodiment of the present disclosure.

The optical sensor 30 is a so-called reflective optical sensor. As shown in FIG. 4, the optical sensor 30 includes a light-emitting portion 30A, a first light-receiving portion 30B, and a second light-receiving portion 30C.

The light-emitting portion 30A emits light L1 toward the intermediate transfer belt 26. It is noted that in FIG. 4, the light L1 is indicated by a bold line with an arrow. For example, the light-emitting portion 30A is a light-emitting element such as a light-emitting diode that emits light of a predetermined wavelength. It is noted that the light-emitting portion 30A may also include a light guide member that guides light emitted from the light-emitting diode to the intermediate transfer belt 26.

The first light-receiving portion 30B receives regular reflection light L2 out of light that is emitted from the light-emitting portion 30A and is reflected by the intermediate transfer belt 26, and outputs a sensing value corresponding to a received light amount. It is noted that in FIG. 4, the regular reflection light L2 is indicated by a broken line with an arrow. For example, the first light-receiving portion 30B is a light-receiving element such as a phototransistor. The first light-receiving portion 30B outputs an electric signal indicating a sensing value corresponding to the received light amount of the regular reflection light L2. The sensing value output from the first light-receiving portion 30B is input to the control portion 7.

The second light-receiving portion 30C receives diffuse reflection light L3 out of light that is emitted from the light-emitting portion 30A and is reflected by the intermediate transfer belt 26, and outputs a sensing value corresponding to a received light amount. It is noted that in FIG.

4, the diffuse reflection light L3 is indicated by a dotted line with an arrow. For example, the second light-receiving portion 30C is a light-receiving element such as a phototransistor. The second light-receiving portion 30C outputs an electric signal indicating a sensing value corresponding to the received light amount of the diffuse reflection light L3. The sensing value output from the second light-receiving portion 30C is input to the control portion 7.

Hereinafter, the first light-receiving portion 30B and the second light-receiving portion 30C may collectively be referred to as a "light-receiving portion 30X".

The control portion 7 senses a toner concentration of a toner image formed on the intermediate transfer belt 26 based on the sensing value input from the light-receiving portion 30X. Specifically, the control portion 7 senses a toner concentration of a black toner image formed on the intermediate transfer belt 26 based on the sensing value input from the first light-receiving portion 30B. In addition, the control portion 7 senses a toner concentration of a cyan, magenta, or yellow toner image formed on the intermediate transfer belt 26 based on the sensing value input from the second light-receiving portion 30C. The configuration including the optical sensor 30 and the control portion 7 is an example of a toner concentration sensing apparatus according to the present disclosure.

Incidentally, in the image forming apparatus 100, a surface condition of the intermediate transfer belt 26 changes along with an increase in the number of uses of the apparatus. When the surface condition of the intermediate transfer belt 26 changes, an amount of light that is emitted from the light-emitting portion 30A and is reflected by the intermediate transfer belt 26 changes, to thus result in lowering of an accuracy of the control portion 7 in sensing a toner concentration of a toner image. In contrast, there is known, as the related art, an image forming apparatus which corrects, based on a sensing value that is output from the light-receiving portion 30X and corresponds to light reflected by a region of the intermediate transfer belt 26 where a toner image is not formed, a sensing value that is output from the light-receiving portion 30X and corresponds to light reflected by a toner image formed on the intermediate transfer belt 26.

Herein, it is considered that the sensing value output from the light-receiving portion 30X includes a first component corresponding to light reflected by the surface of the intermediate transfer belt 26 and a second component corresponding to light reflected by toner adhered onto the surface. Further, it is considered that even if the surface condition of the intermediate transfer belt 26 changes, the amount of light reflected by toner adhered onto the surface of the intermediate transfer belt 26 does not change.

However, in the image forming apparatus according to the related art described above, the first component and the second component included in the sensing value output from the light-receiving portion 30X are not distinguished from each other, and a correction that is based on a sensing value that is output from the light-receiving portion 30X and corresponds to light reflected by a region of the intermediate transfer belt 26 where a toner image is not formed, is carried out with respect to the entire sensing value. Therefore, in the image forming apparatus according to the related art described above, a toner concentration of a toner image cannot be sensed accurately.

In contrast, in the image forming apparatus 100 according to the embodiment of the present disclosure, it is possible to accurately sense a toner concentration of a toner image formed on the intermediate transfer belt 26 as will be described below.

[Configuration of Control Portion 7]

Next, a configuration of the control portion 7 will be described with reference to FIG. 2.

As shown in FIG. 2, the control portion 7 includes a first acquisition processing portion 51, a second acquisition processing portion 52, and a third acquisition processing portion 53.

Specifically, a specific control program for causing the CPU 11 of the control portion 7 to function as the respective portions described above is stored in advance in the ROM 12 of the control portion 7. Then, the CPU 11 of the control portion 7 executes the specific control program stored in the ROM 12 to thus function as the respective functional portions described above. It is noted that some or all of the functional portions included in the control portion 7 may be constituted by an electronic circuit. Alternatively, the specific control program may be a program for causing a plurality of processors to function as the respective functional portions included in the control portion 7.

The first acquisition processing portion 51 acquires a first sensing value that is output from the light-receiving portion 30X and corresponds to light that is emitted from the light-emitting portion 30A and is reflected by a first region of the intermediate transfer belt 26 where a toner image is not formed.

Specifically, the first acquisition processing portion 51 causes the light-emitting portion 30A to emit light L1 toward the first region. Moreover, the first acquisition processing portion 51 acquires the first sensing value output from the first light-receiving portion 30B in accordance with the emission of the light L1 by the light-emitting portion 30A. In addition, the first acquisition processing portion 51 acquires the first sensing value output from the second light-receiving portion 30C in accordance with the emission of the light L1 by the light-emitting portion 30A.

The second acquisition processing portion 52 acquires a second sensing value that is output from the light-receiving portion 30X and corresponds to light that is emitted from the light-emitting portion 30A and is reflected by a second region of the intermediate transfer belt 26 where a toner image has been formed.

Specifically, the second acquisition processing portion 52 forms a predetermined first specific toner image on the intermediate transfer belt 26 using the image forming unit 24. The first specific toner image is a black toner image that is formed based on predetermined image data. Further, at a timing at which the first specific toner image formed on the intermediate transfer belt 26 is conveyed to an irradiation position of the light L1 by the light-emitting portion 30A, the second acquisition processing portion 52 causes the light-emitting portion 30A to emit the light L1. Furthermore, the second acquisition processing portion 52 acquires the second sensing value that is output from the first light-receiving portion 30B in accordance with the emission of the light L1 by the light-emitting portion 30A.

Further, the second acquisition processing portion 52 forms a predetermined second specific toner image on the intermediate transfer belt 26 using any of the image forming units 21 to 23. The second specific toner image is a cyan, magenta, or yellow toner image that is formed based on predetermined image data. Further, at a timing at which the second specific toner image formed on the intermediate transfer belt 26 is conveyed to the irradiation position of the light L1 by the light-emitting portion 30A, the second acquisition processing portion 52 causes the light-emitting portion 30A to emit the light L1. Furthermore, the second acquisition processing portion 52 acquires the second sensing value that is output from the second light-receiving portion 30C in accordance with the emission of the light L1 by the light-emitting portion 30A.

Herein, in the image forming apparatus 100, it is assumed that the sensing value output from the light-receiving portion 30X is constituted by the first component corresponding to light reflected by the surface of the intermediate transfer belt 26 and the second component corresponding to light reflected by toner adhered onto the surface of the intermediate transfer belt 26.

Figure 5:
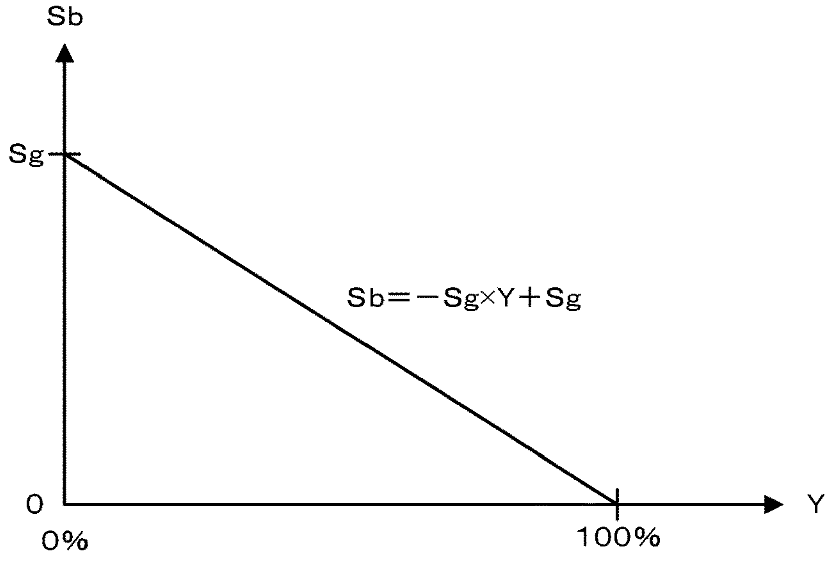
FIG. 5 is a diagram showing a relationship between a first component and a component ratio of a second component in a sensing value.

Also in the image forming apparatus 100, a relationship between the first component and a component ratio of the second component in the sensing value output from the light-receiving portion 30X is defined by a first relational expression that is determined based on the first sensing value acquired by the first acquisition processing portion 51. For example, the first relational expression is a primary expression that is shown in FIG. 5 and indicated by the following Expression (1). It is noted that "Sb" in FIG. 5 and Expression (1) is a symbol that indicates the first component. Moreover, "Y" in FIG. 5 and Expression (1) is a symbol that indicates the component ratio of the second component in the sensing value output from the light-receiving portion 30X. In addition, "Sg" in FIG. 5 and Expression (1) is a symbol that indicates the first sensing value acquired by the first acquisition processing portion 51.

$$Sb=-Sg\times Y+Sg \quad (1)$$

Figure 6:
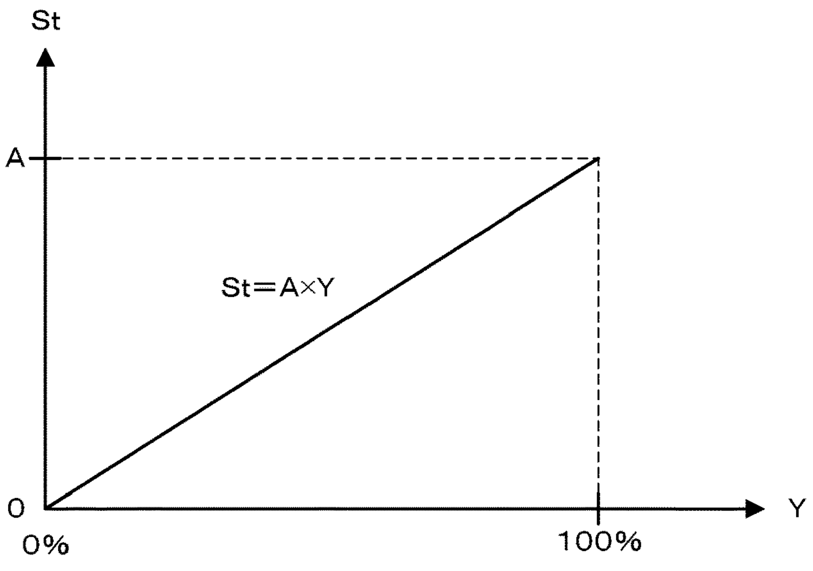
FIG. 6 is a diagram showing a relationship between the second component and the component ratio of the second component in the sensing value.

Also in the image forming apparatus 100, a relationship between the second component and the component ratio of the second component in the sensing value output from the light-receiving portion 30X is defined by a second relational expression that is determined without using the first sensing value acquired by the first acquisition processing portion 51. For example, the second relational expression is a primary expression that is shown in FIG. 6 and indicated by the following Expression (2). It is noted that "St" in FIG. 6 and Expression (2) is a symbol that indicates the second component. Moreover, "A" in FIG. 6 and Expression (2) is a coefficient indicating the sensing value obtained in a case where the component ratio of the second component in the sensing value output from the light-receiving portion 30X is 100%. For example, the coefficient is acquired by forming a toner image that fully covers the surface of the intermediate transfer belt 26 and causing the light-receiving portion 30X to output a sensing value corresponding to the toner image. Alternatively, the coefficient may be acquired by a simulation that is based on information such as light-emitting characteristics of the light-emitting portion 30A, light-receiving characteristics of the light-receiving portion 30X, a positional relationship among the light-emitting portion 30A, the light-receiving portion 30X, and the intermediate transfer belt 26, a color of toner, a material of toner, a shape of toner, a size of toner, and the like.

$$St=A\times Y \quad (2)$$

Further, the sensing value output from the light-receiving portion 30X can be expressed by the following Expression (3) using Expression (1) and Expression (2). It is noted that "Sout" in Expression (3) is a symbol that indicates the sensing value output from the light-receiving portion 30X.

$$S\text{out}=Sb+St=(-Sg\times Y+Sg)+(A\times Y) \quad (3)$$

Furthermore, by modifying Expression (3), the following Expression (4) with which the component ratio of the second component in the sensing value output from the light-receiving portion 30X can be calculated is acquired.

$$Y=(S\text{out}-Sg)/(A-Sg) \quad (4)$$

The third acquisition processing portion 53 uses a specific calculation formula that is determined based on the first relational expression and the second relational expression, and the second sensing value acquired by the second acquisition processing portion 52, to acquire a component ratio of the second component in the second sensing value.

Specifically, the third acquisition processing portion 53 substitutes the first sensing value of the first light-receiving portion 30B acquired by the first acquisition processing portion 51 and the second sensing value of the first light-receiving portion 30B acquired by the second acquisition processing portion 52 into Expression (4) described above, to thus acquire the component ratio of the second component in the second sensing value. In addition, the third acquisition processing portion 53 substitutes the first sensing value of the second light-receiving portion 30C acquired by the first acquisition processing portion 51 and the second sensing value of the second light-receiving portion 30C acquired by the second acquisition processing portion 52 into Expression (4) described above, to thus acquire the component ratio of the second component in the second sensing value. In other words, the specific calculation formula is Expression (4) described above.

[Toner Concentration Sensing Processing]

Figure 7:
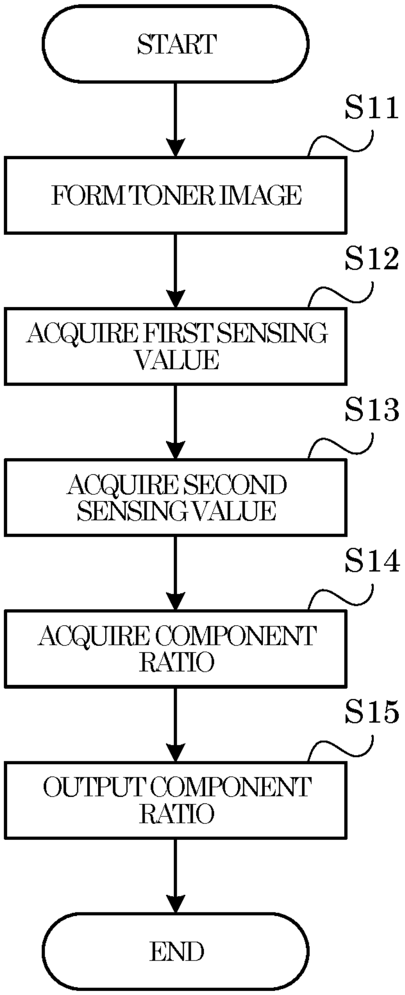
FIG. 7 is a flowchart showing an example of toner concentration sensing processing executed in the image forming apparatus according to the embodiment of the present disclosure.

Hereinafter, with reference to FIG. 7, a toner concentration sensing method according to the present disclosure will be described along with toner concentration sensing processing executed by the control portion 7 in the image forming apparatus 100. Herein, Step S11, Step S12 . . . respectively represent numbers of processing procedures (steps) executed by the control portion 7. For example, the toner concentration sensing processing is executed upon arrival of an execution timing of adjustment processing for adjusting an image forming condition of the image forming portion 3.

The toner concentration sensing processing is processing for sensing a toner concentration of a black toner image. It is noted that processing for sensing a toner concentration of a cyan, magenta, or yellow toner image is similar to the toner concentration sensing processing described below, so descriptions thereof will be omitted.

<Step S11>

First, in Step S11, the control portion 7 forms the first specific toner image on the intermediate transfer belt 26 using the image forming unit 24.

<Step S12>

In Step S12, the control portion 7 acquires the first sensing value that is output from the first light-receiving portion 30B and corresponds to light that is emitted from the light-emitting portion 30A and is reflected by the first region of the intermediate transfer belt 26. Herein, the processing of Step S12 is an example of a first acquisition step according to the present disclosure and is executed by the first acquisition processing portion 51 of the control portion 7.

Specifically, the control portion 7 causes the light-emitting portion 30A to emit light L1 toward the first region. Further, the control portion 7 acquires the first sensing value that is output from the first light-receiving portion 30B in accordance with the emission of the light L1 by the light-emitting portion 30A.

Herein, the first region is preferably a region in the vicinity of the first specific toner image formed in Step S11, that is, the second region. In other words, the emission timing of the light L1 by the light-emitting portion 30A is desirably a timing right before the first specific toner image formed in Step S11 is conveyed to the irradiation position of the light L1 by the light-emitting portion 30A or right after the first specific toner image has passed through the irradiation position.

<Step S13>

In Step S13, the control portion 7 acquires the second sensing value that is output from the first light-receiving portion 30B and corresponds to light that is emitted from the light-emitting portion 30A and is reflected by the second region of the intermediate transfer belt 26. Herein, the processing of Step S11 and Step S13 is an example of a second acquisition step according to the present disclosure and is executed by the second acquisition processing portion 52 of the control portion 7.

Specifically, at a timing at which the first specific toner image formed on the intermediate transfer belt 26 is conveyed to the irradiation position of the light L1 by the light-emitting portion 30A, the control portion 7 causes the light-emitting portion 30A to emit the light L1. In addition, the control portion 7 acquires the second sensing value that is output from the first light-receiving portion 30B in accordance with the emission of the light L1 by the light-emitting portion 30A.

<Step S14>

In Step S14, the control portion 7 uses the specific calculation formula and the second sensing value acquired by the processing of Step S13, to acquire the component ratio of the second component in the second sensing value. Herein, the processing of Step S14 is an example of a third acquisition step according to the present disclosure and is executed by the third acquisition processing portion 53 of the control portion 7.

Specifically, the control portion 7 substitutes the first sensing value acquired by the processing of Step S12 and the second sensing value acquired by the processing of Step S13 into Expression (4) described above, to thus acquire the component ratio of the second component in the second sensing value. The component ratio of the second component in the second sensing value, that is acquired by the processing of Step S14, is treated as a value that indicates a toner concentration of the first specific toner image formed by the processing of Step S11.

<Step S15>

In Step S15, the control portion 7 outputs the component ratio of the second component in the second sensing value, that has been acquired by the processing of Step S14.

Specifically, the control portion 7 outputs the component ratio of the second component in the second sensing value, that has been acquired by the processing of Step S14, to an adjustment processing portion which executes the adjustment processing. The adjustment processing portion may be provided in the control portion 7, or may be provided outside the control portion 7.

The adjustment processing portion adjusts, for example, the image forming condition such as the developing bias voltage to be applied to the developing roller of the image forming unit 24 based on the component ratio of the second component in the second sensing value, that has been output by the processing of Step S15.

In this manner, in the image forming apparatus 100, it is assumed that the sensing value output from the light-receiving portion 30X is constituted by the first component and the second component. Further, the relationship between the first component and the component ratio of the second component in the sensing value output from the light-receiving portion 30X is defined by the first relational expression that is determined based on the first sensing value. Further, the relationship between the second component and the component ratio of the second component in the sensing value output from the light-receiving portion 30X is defined by the second relational expression that is determined without using the first sensing value. Then, in the image forming apparatus 100, the specific calculation formula that is determined based on the first relational expression and the second relational expression, and the second sensing value are used to acquire the component ratio of the second component in the second sensing value. Thus, it is possible to acquire the first component based on the current surface condition of the intermediate transfer belt 26, and acquire the second component irrespective of the current surface condition of the intermediate transfer belt 26. Therefore, the toner concentration of the toner image formed on the intermediate transfer belt 26 can be sensed more accurately than in the conventional configuration in which a correction that is based on a sensing value that is output from the light-receiving portion 30X and corresponds to light reflected by the region of the intermediate transfer belt 26 where a toner image is not formed, is carried out with respect to the entire sensing value output from the light-receiving portion 30X.

It is noted that the first relational expression may alternatively be an n-th degree expression ($n \geq 2$). Also, the second relational expression may alternatively be an n-th degree expression ($n \geq 2$).

Furthermore, the optical sensor 30 may be used to sense a toner concentration of a toner image formed on the photoconductor drum 31. In this case, the photoconductor drum 31 is an example of the image-carrying member according to the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A toner concentration sensing apparatus, comprising:

a light-emitting portion which emits light toward an image-carrying member which carries a toner image;

a light-receiving portion which receives light that is emitted from the light-emitting portion and is reflected by the image-carrying member, and outputs a sensing value corresponding to a received light amount;

a first acquisition processing portion which acquires a first sensing value that is output from the light-receiving portion and corresponds to light that is emitted from the light-emitting portion and is reflected by a first region of the image-carrying member where a toner image is not formed;

a second acquisition processing portion which acquires a second sensing value that is output from the light-receiving portion and corresponds to light that is emitted from the light-emitting portion and is reflected by a second region of the image-carrying member where a predetermined specific toner image has been formed; and a third acquisition processing portion which acquires a toner concentration of the specific toner image, using the first sensing value, the second sensing value, and a predetermined specific calculation formula, wherein the specific calculation formula is represented by: Y=(Sout−Sg)/(A−Sg), where the toner concentration of the specific toner image is Y, the second sensing value is Sout, the first sensing value is Sg, and the second sensing value when the toner concentration of the specific toner image is 100% is A.

2. The toner concentration sensing apparatus according to claim 1, wherein the light-receiving portion receives regular reflection light out of the light that is emitted from the light-emitting portion and is reflected by the image-carrying member, and outputs the sensing value corresponding to the received light amount, and the second acquisition processing portion acquires the second sensing value corresponding to light that is emitted from the light-emitting portion and is reflected by the second region of the image-carrying member where the specific toner image has been formed in black.

3. The toner concentration sensing apparatus according to claim 1, wherein the light-receiving portion receives diffuse reflection light out of the light that is emitted from the light-emitting portion and is reflected by the image-carrying member, and outputs the sensing value corresponding to the received light amount, and the second acquisition processing portion acquires the second sensing value corresponding to light that is emitted from the light-emitting portion and is reflected by the second region of the image-carrying member where the specific toner image has been formed in cyan, magenta, or yellow.

4. An image forming apparatus, comprising:

the toner concentration sensing apparatus according to claim 1; and the image-carrying member.

5. A toner concentration sensing method executed in a toner concentration sensing apparatus including a light-emitting portion which emits light toward an image-carrying member which carries a toner image and a light-receiving portion which receives light that is emitted from the light-emitting portion and is reflected by the image-carrying member, and outputs a sensing value corresponding to a received light amount, the toner concentration sensing method comprising:

a first acquisition step of acquiring a first sensing value that is output from the light-receiving portion and corresponds to light that is emitted from the light-emitting portion and is reflected by a first region of the image-carrying member where a toner image is not formed;

a second acquisition step of acquiring a second sensing value that is output from the light-receiving portion and corresponds to light that is emitted from the light-emitting portion and is reflected by a second region of the image-carrying member where a predetermined specific toner image has been formed; and a third acquisition step of acquiring a toner concentration of the specific toner image, using the first sensing value, the second sensing value, and a predetermined specific calculation formula, wherein the specific calculation formula is represented by: Y=(Sout−Sg)/(A−Sg), where the toner concentration of the specific toner image is Y, the second sensing value is Sout, the first sensing value is Sg, and the second sensing value when the toner concentration of the specific toner image is 100% is A.

* * * * *